(12) United States Patent
Koguchi et al.

(10) Patent No.: US 10,207,715 B2
(45) Date of Patent: Feb. 19, 2019

(54) AUTOMATIC TRANSMISSION CONTROL DEVICE

(71) Applicants: JATCO Ltd, Fuji-shi, Shizuoka (JP); NISSAN MOTOR CO., LTD., Yokohama-shi, Kanagawa (JP)

(72) Inventors: Takashi Koguchi, Yokohama (JP); Sho Okutani, Isehara (JP); Makoto Komatsu, Atsugi (JP); Toshiaki Noda, Atsugi (JP); Takuichiro Inoue, Yamato (JP); Yuuji Nagase, Yokohama (JP); Hiroyasu Tanaka, Atsugi (JP); Hideshi Wakayama, Hadano (JP)

(73) Assignees: JATCO Ltd, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 9 days.

(21) Appl. No.: 15/547,855

(22) PCT Filed: Dec. 16, 2015

(86) PCT No.: PCT/JP2015/085136
§ 371 (c)(1),
(2) Date: Aug. 1, 2017

(87) PCT Pub. No.: WO2016/125402
PCT Pub. Date: Aug. 11, 2016

(65) Prior Publication Data
US 2018/0015928 A1    Jan. 18, 2018

(30) Foreign Application Priority Data

Feb. 2, 2015 (JP) .................................. 2015-018082

(51) Int. Cl.
*F16H 61/16*    (2006.01)
*B60W 30/19*    (2012.01)
(Continued)

(52) U.S. Cl.
CPC .......... *B60W 30/19* (2013.01); *B60W 10/026* (2013.01); *B60W 10/10* (2013.01);
(Continued)

(58) Field of Classification Search
CPC ............. B60W 10/11; B60W 2540/106; F16H 2059/193
See application file for complete search history.

(56) References Cited

U.S. PATENT DOCUMENTS

| | | | | |
|---|---|---|---|---|
| 5,226,351 A | * | 7/1993 | Matsuoka | F16H 61/0213 477/121 |
| 5,643,133 A | * | 7/1997 | Minowa | B60W 10/06 477/102 |
| 6,000,378 A | * | 12/1999 | Minowa | B60W 10/06 123/436 |

FOREIGN PATENT DOCUMENTS

JP    2010-286042 A    12/2010

* cited by examiner

*Primary Examiner* — Tisha D Lewis
(74) *Attorney, Agent, or Firm* — Foley & Lardner LLP

(57) ABSTRACT

An automatic transmission control device implements a downshift by disengagement of a clutch that is engaged in a gear position before the downshift. It is determined whether an engine state is in a predetermined region in which a change of an engine torque per a change of an accelerator pedal opening is smaller than that in another region, and the engine torque is within a predetermined range, and an engine rotational speed is within a predetermined range. It is determined whether an operating state is in a predetermined state of accelerator operation in which the accelerator pedal opening is larger than a predetermined value, and an accelerator pedal opening change rate has an absolute value smaller than a predetermined value. The downshift is inhibited in response to determination that the engine state is in
(Continued)

the predetermined region and the operating state is in the predetermined state of accelerator operation.

4 Claims, 8 Drawing Sheets

(51) Int. Cl.
*F16H 59/18* (2006.01)
*F16H 59/44* (2006.01)
*B60W 10/02* (2006.01)
*B60W 10/10* (2012.01)
*F16H 61/02* (2006.01)
*F16H 61/04* (2006.01)
*F16H 59/42* (2006.01)
*F16H 61/14* (2006.01)
*F16H 61/684* (2006.01)
*F16H 59/14* (2006.01)
*F16H 59/36* (2006.01)
*F16H 59/20* (2006.01)

(52) U.S. Cl.
CPC ............. *F16H 59/18* (2013.01); *F16H 59/44* (2013.01); *F16H 61/0213* (2013.01); *F16H 61/04* (2013.01); *F16H 61/16* (2013.01); *B60W 2510/0638* (2013.01); *B60W 2510/0661* (2013.01); *B60W 2520/10* (2013.01); *B60W 2540/10* (2013.01); *B60W 2540/103* (2013.01); *B60W 2540/106* (2013.01); *B60W 2710/024* (2013.01); *B60W 2710/1005* (2013.01); *F16H 59/141* (2013.01); *F16H 59/20* (2013.01); *F16H 59/42* (2013.01); *F16H 61/14* (2013.01); *F16H 61/684* (2013.01); *F16H 2059/147* (2013.01); *F16H 2059/183* (2013.01); *F16H 2059/366* (2013.01)

|  | L/B | H/C | R/B |
|---|---|---|---|
| FIRST GEAR | O | × | × |
| SECOND GEAR | × | O | × |
| REVERSE | × | × | O |
| NEUTRAL | × | × | × |

KICKDOWN TORQUE CHANGE DETERMINATION PROCESS

KICKDOWN OPENING DETERMINATION PROCESS

REGION DETERMINATION PROCESS

SLOW DEPRESSION DETERMINATION PROCESS

AUTOMATIC TRANSMISSION CONTROL DEVICE

TECHNICAL FIELD

The present invention relates to an automatic transmission control device.

BACKGROUND ART

A patent document 1 discloses a known example of automatic transmission control device. This publication discloses that during a shift such as a downshift where a torque transmission capacity from a drive side to a driven side is increased by slip-engagement of a high and low reverse clutch (henceforth referred to as first frictional engagement element), an engagement capacity of a low coast brake (henceforth referred to as second frictional engagement element) connected to the driven side is increased, to apply a reaction force in a direction opposite to a direction of application of an engagement force of the first frictional engagement element, and thereby suppress judder during shifting. In other words, since judder is likely to occur when a shift employing engagement switching is performed under a condition that the engagement force of the first frictional engagement element is relatively high, the distributed force of the first frictional engagement element is reduced by increasing the engagement capacity of the second frictional engagement element connected to the driven side.

However, the increase of the engagement capacity of the second frictional engagement element tends to cause interlocking, and thereby may cause a driving force to fall. Furthermore, the increase of the engagement capacity of the second frictional engagement element causes a necessity to take a countermeasure against judder of the second frictional engagement element.

PRIOR ART DOCUMENT(S)

Patent Document(s)

Patent Document 1: JP 2010-286042 A

SUMMARY OF THE INVENTION

The present invention is made with attention to the problem described above, and is targeted for providing an automatic transmission control device capable of avoiding a judder due to a downshift.

In order to accomplish the target described above, according to the present invention, an automatic transmission control device for an automatic transmission, comprises: a shift control means configured to implement a downshift by disengagement of a first frictional engagement element, wherein the first frictional engagement element is engaged in a gear position before the downshift; an engine state determination means configured to determine whether or not an engine state is in a predetermined region in which a change of an engine torque per a change of an accelerator pedal opening is smaller than that in another region, and the engine torque is within a predetermined range, and an engine rotational speed is within a predetermined range; an operating state determination means configured to determine whether or not an operating state is in a predetermined state of accelerator operation in which the accelerator pedal opening is larger than or equal to a predetermined value, and an accelerator pedal opening change rate has an absolute value smaller than or equal to a predetermined value; and a downshift inhibition means configured to inhibit the downshift in response to a combination of a determination by the engine state determination means that the engine state is in the predetermined region and a determination by the operating state determination means that the operating state is in the predetermined state of accelerator operation.

This serves to prevent a judder due to downshifting by inhibiting downshifting when the engine is operating in the predetermined region, and the operating state is in the predetermined state of accelerator operation.

MODE(S) FOR CARRYING OUT THE INVENTION

Figure 1:
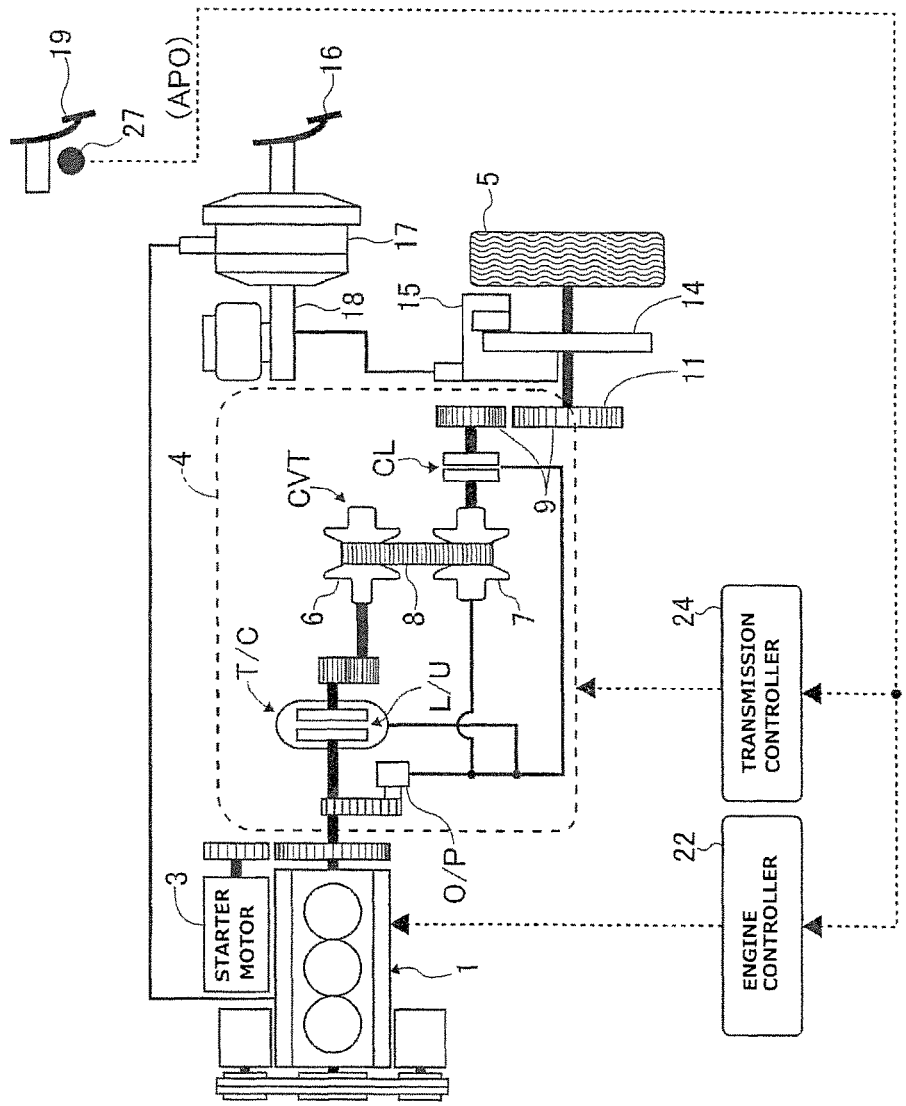
FIG. 1 is a schematic system diagram showing a driveline of a vehicle and its whole control system according to a first embodiment.

<First Embodiment> FIG. 1 is a schematic system diagram showing a driveline of a vehicle and its whole control system according to a first embodiment. The vehicle of FIG. 1 is provided with an engine 1 as a drive source, wherein engine 1 is configured to be started by a starter motor 3. Engine 1 is drivingly connected to driving wheels 5 via a V-belt type continuously variable transmission 4, and is configured to be disconnected therefrom as occasion arises.

Continuously variable transmission 4 includes a variator "CVT", which is a V-belt type continuously variable transmission mechanism including a primary pulley 6, a secondary pulley 7, and a V-belt 8 (endless flexible member) wound around pulleys 6, 7. V-belt 8 is implemented by a configuration where a plurality of elements are bound by an endless belt, but is not so limited, and may be implemented by a chain type. Primary pulley 6 is connected to a crankshaft of engine 1 through a torque converter "T/C", while secondary pulley 7 is connected through a clutch "CL" and then through a final gearset 9 to driving wheels 5. In this embodiment, elements such as clutches and brakes for connection and disconnection of a power transmission line are generally referred as clutches. FIG. 1 shows conceptually the power transmission line, where a high clutch "H/C", a reverse brake "R/B", and a low brake "L/B" provided in an auxiliary is transmission 31 described below are indicated collectively as clutch "CL". When clutch CL is engaged, power from engine 1 is inputted to primary pulley 6 through the torque converter T/C including a lockup clutch "L/U", and then transmitted through the V-belt 8, secondary pulley 7, clutch CL, and final gearset 9 in this order to driving wheels 5 for driving.

While the engine power is being transmitted, combination of decrease of a pulley V groove width of primary pulley 6 and increase of a pulley V groove width of secondary pulley 7 causes an increase of an arc diameter of winding between V-belt 8 and primary pulley 6, and a decrease of an arc diameter of winding between V-belt 8 and secondary pulley 7 simultaneously. Variator CVT thus causes an upshift to higher shift position pulley ratios (higher shift position transmission ratios). When the upshift to higher shift position transmission ratios is maximally executed, the transmission ratio is set at the highest shift position transmission ratio.

Conversely, combination of increase of the pulley V groove width of primary pulley 6 and decrease of the pulley V groove width of secondary pulley 7 causes a decrease of the arc diameter of winding between V-belt 8 and primary pulley 6, and an increase of the arc diameter of winding between V-belt 8 and secondary pulley 7 simultaneously. Variator CVT thus causes a downshift to lower shift position pulley ratios (lower shift position transmission ratios). When the downshift to lower shift position transmission ratios is maximally executed, the transmission ratio is set at the lowest shift position transmission ratio.

Variator CVT includes a primary rotational speed sensor 6a configured to sense a rotational speed of primary pulley 6, and a secondary rotational speed sensor 7a configured to sense a rotational speed of secondary pulley 7. An actual transmission ratio is calculated based on the rotational speeds sensed by the rotational speed sensors, and a hydraulic control of each pulley is performed to conform the actual transmission ratio to a target transmission ratio.

An engine controller 22 is configured to receive input of a signal from an accelerator pedal opening sensor 27, and control the output of engine 1, wherein accelerator pedal opening sensor 27 is configured to sense a quantity of depression of an accelerator pedal (accelerator pedal opening) APO. A transmission controller 24 is configured to perform a shift control of variator CVT (V-belt type continuously variable transmission mechanism CVT), and a shift control of auxiliary transmission 31, and an engagement and disengagement control of clutch CL, based on a signal from accelerator pedal opening sensor 27, a signal from a vehicle speed sensor 32 (see FIG. 2), a signal from an acceleration sensor 33 (see FIG. 2), and a torque signal from engine controller 22. The control of variator CVT and auxiliary transmission 31 is performed based on hydraulic pressure supplied by an oil pump "O/P" of a mechanical type which is driven by the engine.

Figures 2A, 2B:
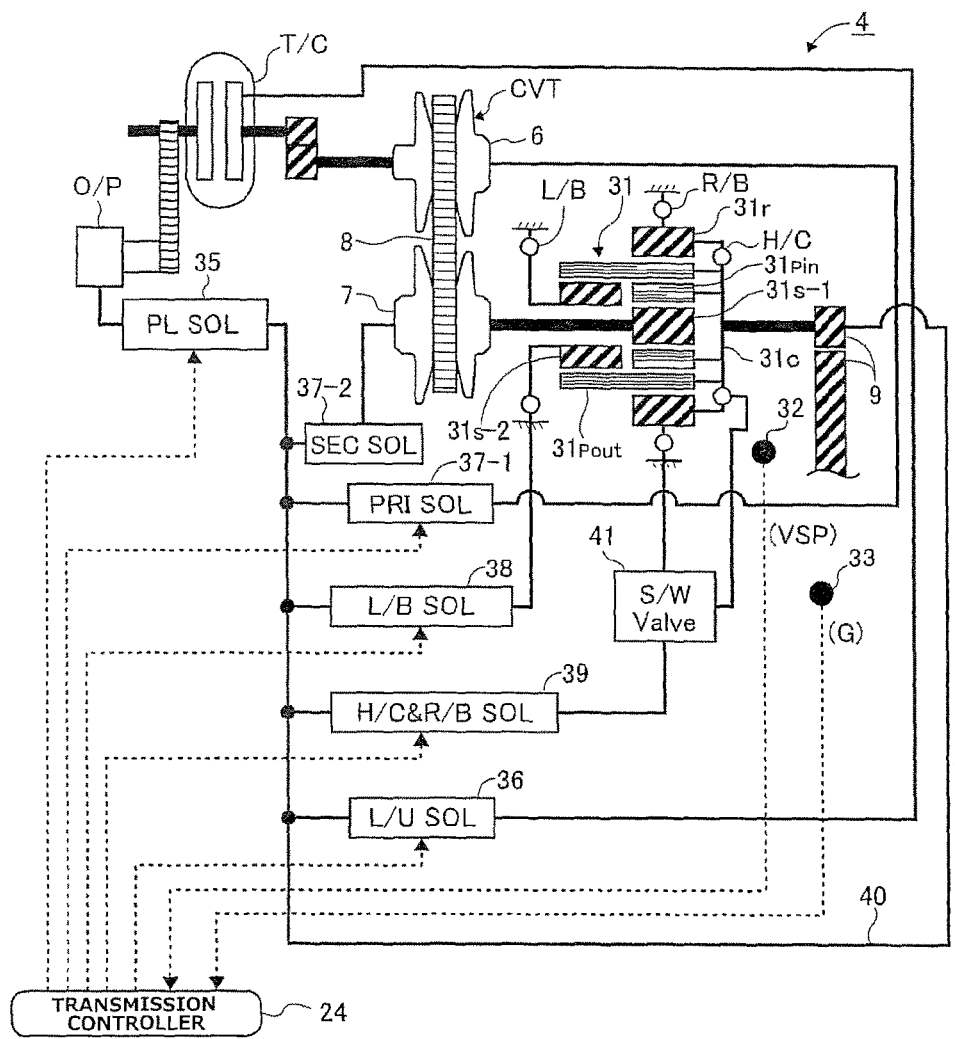
FIG. 2A is a schematic system diagram showing the driveline of the vehicle and its whole control system according to the first embodiment.
FIG. 2B is a clutch engagement logic diagram for clutches in an auxiliary transmission mounted in a V-belt type continuously variable transmission in the driveline of the vehicle according to the first embodiment.

FIG. 2A is a schematic system diagram showing the driveline of the vehicle and its whole control system according to the first embodiment, and FIG. 2B is a clutch engagement logic diagram for clutch CL (specifically, H/C, R/B, L/B) in auxiliary transmission 31 mounted in continuously variable transmission 4 in the driveline of the vehicle according to the first embodiment. As shown in FIG. 2A, auxiliary transmission 31 is composed of a Ravigneaux-type planetary gearset including combined sun gears 31s-1 and 31s-2, an inner pinion 31pin, an outer pinion 31pout, a ring gear 31r, and a carrier 31c carrying the pinions 31pin, 31pout rotatably.

Of combined sun gears 31s-1 and 31s-2, sun gear 31s-1 is connected to secondary pulley 7 to serve as an input rotation member, while sun gear 31s-2 is arranged coaxially with secondary pulley 7, and configured to perform free rotation.

Inner pinion 31pin is meshed with sun gear 31s-1, while inner pinion 31pin and sun gear 31s-2 are meshed with outer pinion 31pout. Outer pinion 31pout is meshed with an inner periphery of ring gear 31r, and carrier 31c is connected to final gearset 9 to serve as an output rotation member. Carrier 31c and ring gear 31r are configured to be connectable to each other by high clutch H/C as clutch CL. Ring gear 31r is configured to be held stationary by reverse brake R/B as clutch CL. Sun gear 31s-2 is configured to be held stationary by low brake L/B as clutch CL.

Auxiliary transmission 31 is configured to select one of a forward first shift position, a second shift position, and a reverse shift position, by engagement of a combination of high clutch H/C, reverse brake R/B, and low brake L/B as indicated by an open circle in FIG. 2B, and disengagement of the remaining thereof as indicated by "X" in FIG. 2B. When all of high clutch H/C, reverse brake R/B, and low brake L/B are disengaged, auxiliary transmission 31 is in a neutral state transmitting no power. When low brake L/B is engaged under this condition, auxiliary transmission 31 is brought into a state for the forward shift position (state of speed reduction). When high clutch H/C is engaged, auxiliary transmission 31 is brought into a state for the forward second shift position (state of direct connection). When reverse brake R/B is engaged, auxiliary transmission 31 is brought into a state for the rearward shift position (state of reverse). Continuously variable transmission 4 of FIG. 2A can disconnect variator CVT (secondary pulley 7) from driving wheels 5, by disengagement of every clutch CL (H/C, R/B, L/B) to bring the auxiliary transmission 31 into the neutral state.

Continuously variable transmission 4 of FIG. 2A is controlled by oil as a working medium which is supplied by mechanical oil pump O/P driven by the engine. Transmission controller 24 implements the control of variator CVT by a line pressure solenoid 35, a lockup solenoid 36, a primary pulley pressure solenoid 37-1, a secondary pulley pressure solenoid 37-2, a low brake pressure solenoid 38, a high clutch pressure and reverse brake pressure solenoid 39, and a switch valve 41, as follows. Transmission controller 24 is configured to receive not only input of the signal described above with reference to FIG. 1, but also input of the signal form vehicle speed sensor 32 sensing vehicle speed VSP, and the signal from acceleration sensor 33 sensing vehicle acceleration G.

Line pressure solenoid 35 is configured to regulate the oil from mechanical oil pump O/P to form a line pressure PL corresponding to a vehicle-requested driving force, in response to a command from transmission controller 24. Lockup solenoid 36 is configured to supply line pressure PL to torque converter T/C as occasion arises, and control the state of engagement of lockup clutch L/U, and thereby bring the input and output elements into a lockup state where they are connected directly, in response to a lockup command from transmission controller 24.

Primary pulley pressure solenoid 37-1 is configured to regulate line pressure PL to form a primary pulley pressure in response to a CVT transmission ratio command from transmission controller 24, and supply the primary pulley pressure to primary pulley 6, and thereby control the V-groove width of primary pulley 6 and the V-groove width of secondary pulley 7 to conform the CVT transmission ratio to a command from transmission controller 24, and thereby fulfill a CVT transmission ratio command from transmission controller 24. Secondary pulley pressure solenoid 37-2 is configured to regulate line pressure PL to form a secondary pulley pressure in response to a clamp force command from transmission controller 24, and supply the secondary pulley pressure to secondary pulley 7, and thereby sandwich the V-belt 8 by secondary pulley 7 under pressure to prevent slip of V-belt 8. Low brake pressure solenoid 38 is configured to supply the line pressure PL as a low brake pressure to low brake L/B to engage the low brake L/B, and thereby fulfill a first shift position selection signal for auxiliary transmission 31, while transmission controller 24 is outputting the first shift position selection signal. High clutch pressure and reverse brake pressure solenoid 39 is configured to supply the line pressure PL as a high clutch pressure and reverse brake pressure to switch valve 41, while transmission controller 24 is outputting a second shift position selection signal or a reverse shift position selection signal for auxiliary transmission 31.

With the second shift position selection command for auxiliary transmission 31, switch valve 41 directs the line pressure PL from solenoid 39, as a high clutch pressure, to high clutch H/C, and thereby engages the high clutch H/C, and thereby fulfills the second shift position selection command. With the reverse shift position selection command for auxiliary transmission 31, switch valve 41 directs the line pressure PL from solenoid 39, as a reverse brake pressure, to reverse brake R/B, arid thereby engages the reverse brake R/B, and thereby fulfills the reverse shift position selection command.

Figure 3:
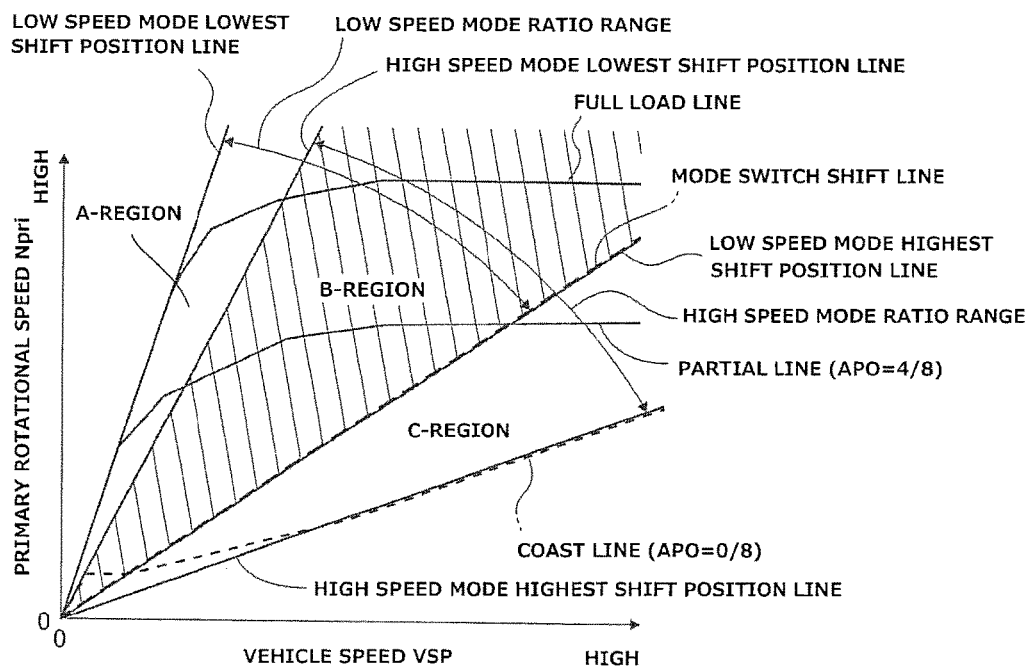
FIG. 3 shows an example of shift map stored in a transmission controller according to the first embodiment.

<Shift Control Process> The following describes a shift control process. FIG. 3 shows an example of shift map stored in transmission controller 24 according to the first embodiment. Transmission controller 24 is configured to control continuously variable transmission 4, depending on a state of operation of the vehicle (vehicle speed VSP, primary rotational speed Npri, and accelerator pedal opening APO in the first embodiment), with reference to the shift map. In the shift map, an operating point of continuously variable transmission 4 is defined by vehicle speed VSP and primary rotational speed Npri. The gradient of a line connecting the operating point of continuously variable transmission 4 and a zero-point at a left lower corner of the shift map, corresponds to the transmission ratio of continuously variable transmission 4 (overall transmission ratio obtained by multiplying the transmission ratio of auxiliary transmission 31 to the transmission ratio of variator CVT, henceforth referred to as "through transmission ratio").

In the shift map, as in a shift map for a conventional belt type continuously variable transmission, a shift line is set per accelerator pedal opening APO, wherein shifting of continuously variable transmission 4 is based on the shift line selected depending on accelerator pedal opening APO. For simplicity, FIG. 3 shows a full load line (shift line for accelerator pedal opening APO=8/8), a partial line (shift line for accelerator pedal opening APO=4/8), and a coast line (shift line for accelerator pedal opening APO=0/8) only.

While continuously variable transmission 4 is in a low speed mode, continuously variable transmission 4 can shift between a low speed mode lowest shift position line and a low speed mode highest shift position line, wherein the low speed mode lowest shift position line is obtained by setting the transmission ratio of variator CVT to the lowest shift position transmission ratio, and the low speed mode highest shift position line is obtained by setting the transmission ratio of variator CVT to the highest shift position transmission ratio. Under this condition, the operating point of continuously variable transmission 4 moves within an A-region and a B-region. While continuously variable transmission 4 is in a high speed mode, continuously variable transmission 4 can shift between a high speed mode lowest shift position line and a high speed mode highest shift position line, wherein the high speed mode lowest shift position line is obtained by setting the transmission ratio of variator CVT to the lowest shift position transmission ratio, and the high speed mode highest shift position line is obtained by setting the transmission ratio of variator CVT to the highest shift position transmission ratio. Under this condition, the operating point of continuously variable transmission 4 moves within the B-region and a C-region.

The transmission ratio of each shift position of auxiliary transmission 31 is set such that the transmission ratio corresponding to the low speed mode highest shift position line (i.e. low speed mode highest shift position transmission ratio) is smaller than the transmission ratio corresponding to the high speed mode lowest shift position line (i.e. high speed mode lowest shift position transmission ratio). By this setting, the possible range of the through transmission ratio of continuously variable transmission 4 in the low speed mode ("LOW SPEED MODE RATIO RANGE" in FIG. 3) overlaps partially with the possible range of the through transmission ratio of continuously variable transmission 4 in the high speed mode ("HIGH SPEED MODE RATIO RANGE" in FIG. 3). Accordingly, when the operating point of continuously variable transmission 4 is within the B-region between the high speed mode lowest shift position line and the low speed mode highest shift position line, continuously variable transmission 4 can select any one of the low speed mode and the high speed mode.

Furthermore, in the shift map, a mode switch shift line for shifting of auxiliary transmission 31 is set to overlap with the low speed mode highest shift position line. The through transmission ration corresponding to the mode switch shift line (henceforth referred to as mode switch shift line "mRaio") is set equal to the low speed mode highest shift position transmission ratio. This setting of the mode switch shift line is made, because it serves to reduce the input torque to auxiliary transmission 31 as the transmission ratio of variator CVT decreases, and thereby suppress a shift shock caused by shifting of auxiliary transmission 31.

When the operating point of continuously variable transmission 4 crosses the mode switch shift line, namely, when the actual value of the through transmission ratio changes to pass through the mode switch transmission ratio mRatio, transmission controller 24 performs cooperative shifting in both of variator CVT and auxiliary transmission 31, and thereby performs switching between the high speed mode and the low speed mode.

<Kickdown Inhibition Control Process> The following describes a kickdown inhibition control process. The term "kickdown" is used to refer, for example, a downshift from the second shift position to the first shift position, when depression for accelerator pedal opening APO above a predetermined opening change rate threshold value $\Delta APO1$ causes a torque change above a predetermined torque change quantity threshold value $\Delta T1$ while driving with the second shift position of auxiliary transmission 31. When accelerator pedal 19 is slowly depressed during running, the depression does not indicate no intention of rapid acceleration, but accelerator pedal opening APO gradually increases. The predetermined opening change rate threshold value ΔAPO1 for kickdown determination is determined based on vehicle speed VSP and accelerator pedal opening APO. Specifically, predetermined opening change rate threshold value ΔAPO1 is set to decrease, as accelerator pedal opening APO increases, and as vehicle speed VSP increases. Accordingly, even if a condition that accelerator pedal opening change rate ΔAPO is not so large continues, a kickdown request may be issued as predetermined opening change rate threshold value ΔAPO1 decreases.

A downshift by kickdown is performed with accelerator pedal opening APO relatively large, so that the high clutch pressure supplied to high clutch H/C is based on supply of the line pressure that has been enhanced relatively depending on accelerator pedal opening APO. Under this condition, the high clutch pressure is reduced to a shelf pressure, and the low brake pressure of low brake L/B is increased. In this situation, although engine torque TE is relatively high, it may be impossible to obtain a sufficient torque to carry out the shifting, if change of engine torque TE in the increasing direction is small.

Figure 9:
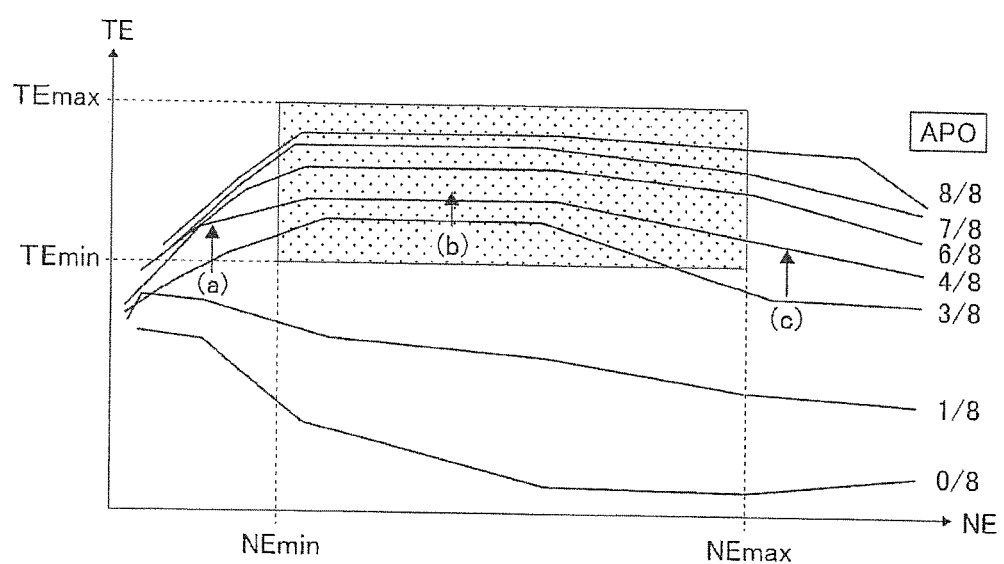
FIG. 9 is a characteristic diagram showing characteristics of engine torque.

FIG. 9 is a characteristic diagram showing characteristics of engine torque. For example, in a region indicated by hatching pattern in FIG. 9, an engine torque change quantity ΔT(b) corresponding to a change of accelerator pedal opening from 3/8 to 4/8 is smaller than an engine torque change quantity ΔT(a) at a lower engine rotational speed side of the region indicated by hatching pattern and an engine torque change quantity ΔT(c) corresponding to a change of accelerator pedal opening in a region on a higher engine rotational speed side of the region indicated by hatching pattern. Namely, even if accelerator pedal opening APO increases, it is not expected that engine torque TE increases significantly. This tendency is shown especially by a turbo engine or the like. Accordingly, for high clutch H/C, a shift employing engagement switching is performed under a condition that the high clutch pressure is reduced from a high level (it can be assumed that it is not reduced sufficiently) and change of the engine torque in the increasing direction is insufficient. This may cause a judder, i.e. a vibration due to a torque fluctuation by repeated alternation between static frictional force and dynamic frictional force on a surface of a frictional member of high clutch H/C. For improvement, in the first embodiment, kickdown is inhibited during a driving condition where a judder may occur. The first embodiment employs an example where kickdown is inhibited, but it is not limited to kickdown. Naturally, it may be configured to inhibit downshifting during any driving condition where a judder may occur.

Figure 4:
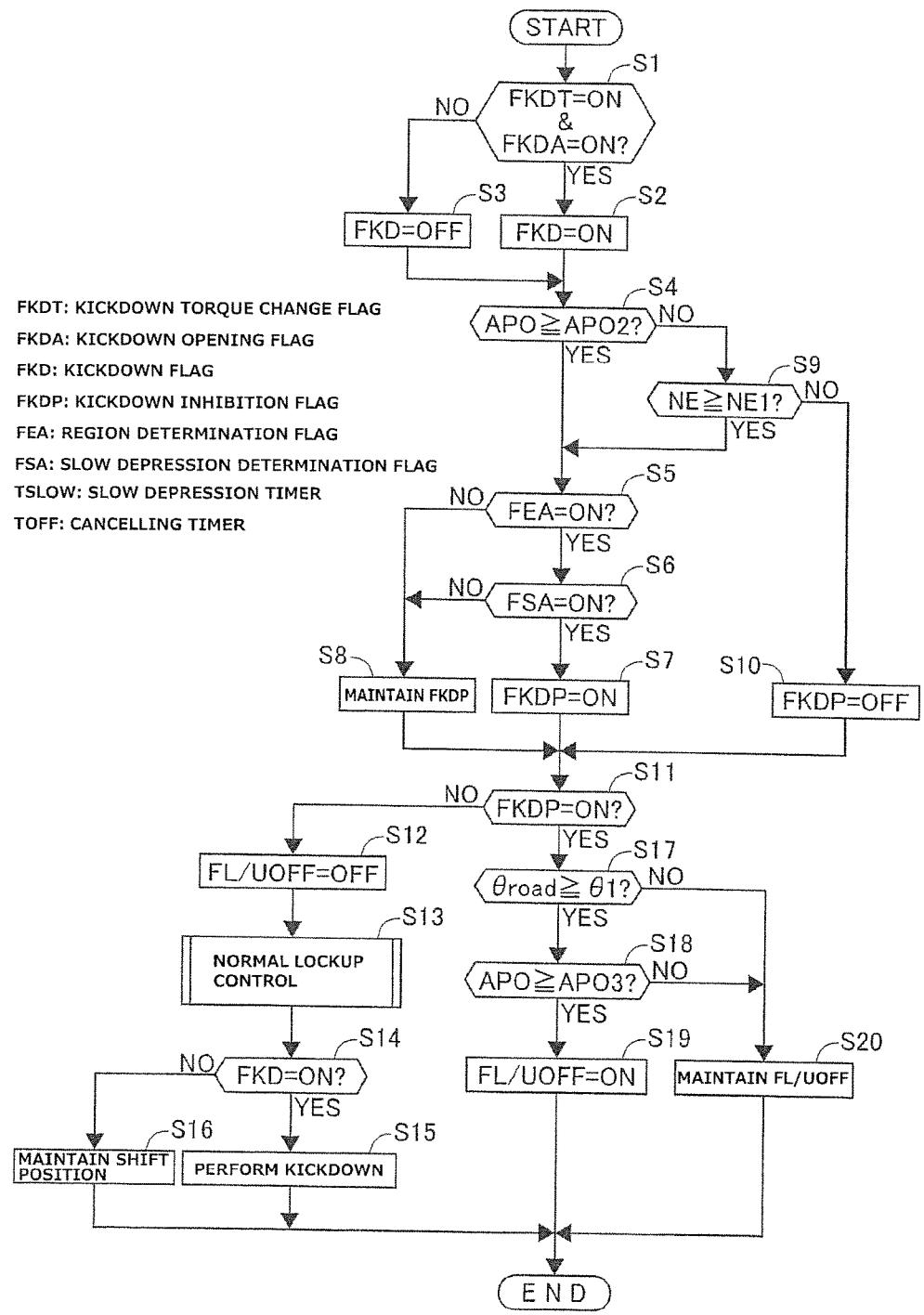
FIG. 4 is a flow chart showing a kickdown inhibition control process according to the first embodiment.

FIG. 4 is a flow chart showing the kickdown inhibition control process according to the first embodiment.

<Kickdown Determination Process; See FIG. 4> At Step S1, it determines whether or not a kickdown torque change flag FKDT (henceforth referred to as FKDT) is on and a kickdown opening flag FKDA (henceforth referred to as FKDA) is on. When both are on, it proceeds to Step S2. Otherwise, it proceeds to Step S3. At Step S2, it sets a kickdown flag FKD (henceforth referred to as FKD) to on-state. At Step S3, it sets FKD to off-state.

Figure 5:
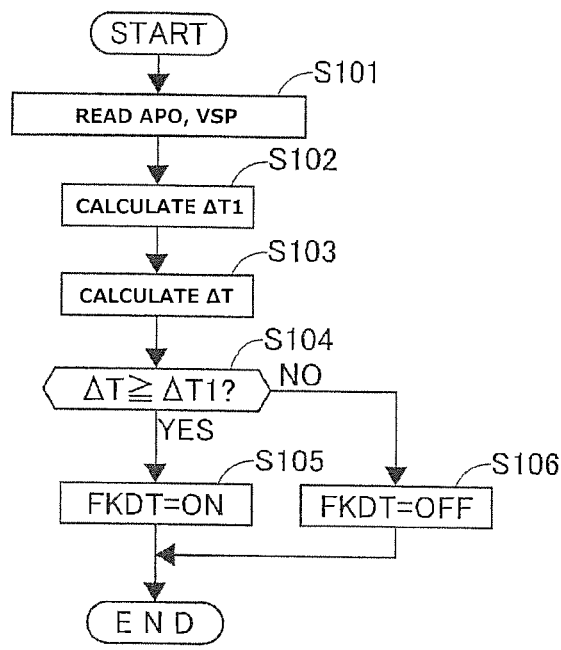
FIG. 5 is a flow chart showing a kickdown torque change determination process according to the first embodiment.
Figure 6:
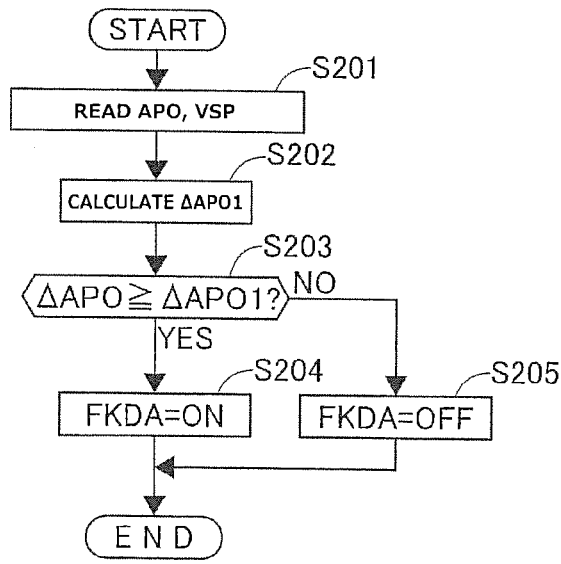
FIG. 6 is a flow chart showing a kickdown opening determination process according to the first embodiment.

The following describes a process of setting FKDT and FKDA. FIG. 5 is a flow chart showing a kickdown torque change determination process according to the first embodiment. FIG. 6 is a flow chart showing a kickdown opening determination process according to the first embodiment.

<Process of Setting Kickdown Torque Change Flag FKDT; See FIG. 5> At Step S101, it reads accelerator pedal opening APO and vehicle speed VSP. At Step S102, it calculates the predetermined torque change quantity threshold value ΔT1. Specifically, the calculation is such that as accelerator pedal opening APO increases, and as vehicle speed VSP increases, the value of ΔT1 decreases. This calculation is not limited specifically but may be implemented by using an equation, or by using a prepared map or the like, or by using a gain corresponding to various kinds of parameters. At Step S103, it calculates a torque change quantity ΔT as a difference between a previous value of engine torque TE and a current value of engine torque TE. At Step S104, it determines whether or not torque change quantity ΔT is larger than or equal to predetermined torque change quantity threshold value ΔT1. In case of YES, it proceeds to Step S105 where it sets FKDT to on-state. On the other hand, in case of NO, it proceeds to Step S106 where it sets FKDT to off-state.

<Process of Setting Kickdown Opening Flag FKDA; See FIG. 6> At Step S201, it reads accelerator pedal opening APO and vehicle speed VSP. At Step S202, it calculates predetermined opening change rate threshold value ΔAPO1. Specifically, the calculation is such that as accelerator pedal opening APO increases, and as vehicle speed VSP increases, the value of ΔAPO1 decreases. This calculation is not limited specifically but may be implemented by using an equation, or by using a prepared map or the like, or by using a gain corresponding to various kinds of parameters. At Step S203, it determines whether or not accelerator pedal opening change rate ΔAPO of accelerator pedal opening APO is greater than or equal to predetermined opening change rate threshold value ΔAPO1. In case of YES, it proceeds to Step S204 where it sets FKDA to on-state. On the other hand, in case of NO, it proceeds to Step S205 where it sets FKDA to off-state. Opening change rate ΔAPO is a quantity produced by dividing a difference by a control cycle period, wherein the difference is between a previous value of accelerator pedal opening APO and a current value of accelerator pedal opening APO. However, it is not limited specifically but may be implemented simply by the difference between the previous value of APO and the current value of APO.

In this way, at Steps S1 to S3, it performs a normal kickdown determination process, and if a kickdown request is present, sets FKD to on-state, and if the kickdown request is absent, sets FKD to off-state.

<Process of Setting Kickdown Inhibition Flag FKDP; See FIG. 4> At Step S4, it determines whether or not accelerator pedal opening APO is larger than or equal to a predetermined opening APO2. When accelerator pedal opening APO is larger than or equal to the predetermined opening APO2, it proceeds to Step S5. Otherwise, it proceeds to Step S9. At Step S5, it determines whether or not a region determination flag FEA (henceforth referred to as FEA) is on. In case of on-state, it proceeds to Step S6. In case of off-state, it proceeds to Step S8. At Step S7, it sets a kickdown inhibition flag FKDP (henceforth referred to as FKDP) to on-state. At Step S8, it maintains the state of FKDP. Namely, in case of FKDP=ON, it maintains FKDP in the on-state, and in case of FKDP=OFF, it maintains FKDP in the off-state.

Figure 7:
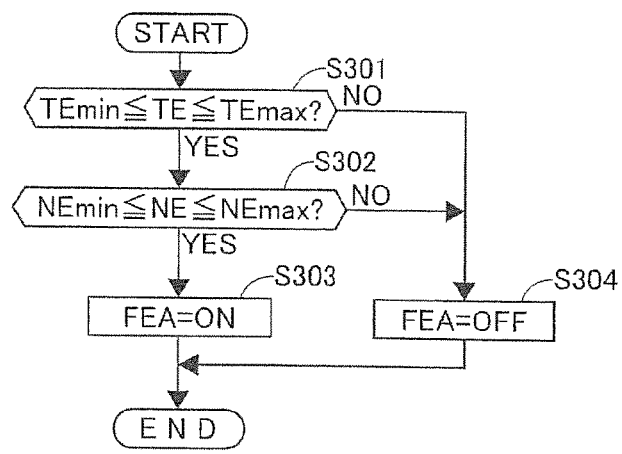
FIG. 7 is a flow chart showing a region determination process according to the first embodiment.
Figure 8:
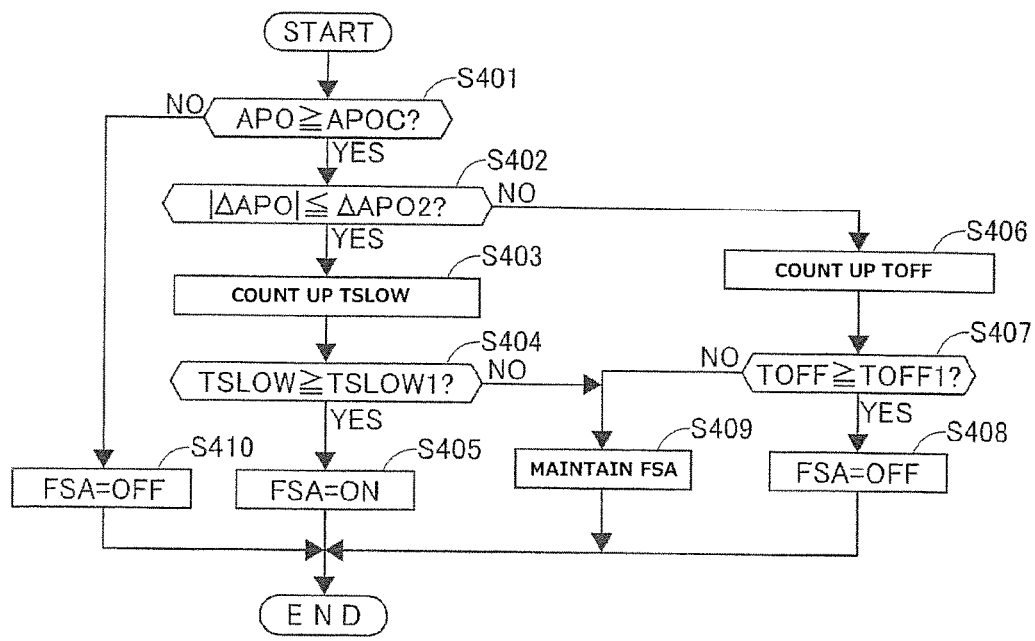
FIG. 8 is a flow chart showing a slow depression determination process according to the first embodiment.

The following describes a process of setting FEA and FSA. FIG. 7 is a flow chart showing a region determination process according to the first embodiment. FIG. 8 is a flow chart showing a slow depression determination process according to the first embodiment.

<Process of Setting Region Determination Flag FEA; See FIG. 7> At Step S301, it determines whether or not engine torque TE is larger than or equal to a torque lower limit TEmin and smaller than or equal to a torque upper limit TEmax. When engine torque TE is within the range, it proceeds to Step S302. Otherwise, it proceeds to Step S304.

At Step S302, it determines whether or not engine rotational speed NE is greater than or equal to a rotational speed lower limit NEmin and lower than or equal to a rotational speed upper limit NEmax. When engine rotational speed NE is within the range, it proceeds to Step S303. Otherwise, it proceeds to Step S304. Specifically, it determines whether or not the current value of engine torque TE is within the hatching region in FIG. 9. When the current value of engine torque TE is within the hatching region, it indicates that engine torque TE is unlikely to increase as accelerator pedal opening APO increases, and it indicates that this region is a region where the judder of high clutch H/C is likely to occur.

<Process of Setting Slow Depression Determination Flag FSA; see FIG. 8> At Step S401, it determines whether or not accelerator pedal opening APO is larger than or equal to a predetermined value APOC indicating a state of coast running. In case of YES, it proceeds to Step S402. In case of NO, it proceeds to Step S410 where it set FSA to off-state. Namely, when in the state of coast running, it is not required to care of judder, and kickdown is not inhibited. At Step S402, it determines whether or not the absolute value of accelerator pedal opening change rate ΔAPO is smaller than or equal to a predetermined opening change rate threshold value ΔAPO2 indicative of slow depression. In case of YES, it proceeds to Step S403. In case of NO, it proceeds to Step S406. Namely, when accelerator pedal opening change rate ΔAPO is small, it means that accelerator pedal 19 is being depressed slowly or being released slowly.

At Step S403, it counts up a slow depression timer TSLOW (henceforth referred to as TSLOW). At Step S404, it determines whether or not TSLOW is greater than or equal to a predetermined time period TSLOW1 indicating that the accelerator pedal continues to be being depressed slowly. In case of YES, it proceeds to Step S405 where it sets FSA to on-state. In case of NO, it proceeds to Step S409 where it maintains FSA in the current state. Namely, with slow depression, it is likely to enter a region where judder occurs, and there is no significant intention of acceleration, so that it is prioritized to avoid judder.

At Step S406, it counts up a cancelling timer TOFF (henceforth referred to as TOFF). At Step S407, it determines whether or not TOFF is greater than or equal to a predetermined time period TOFF1 indicating that the accelerator pedal continues to be being depressed. In case of YES, it proceeds to Step S408 where it sets FSA to off-state. In case of NO, it proceeds to Step S409 where it maintains FSA in the current state. This situation of cancelling is based on assumption of situations such as one that when entering into an express highway, it enters a lane with the accelerator pedal depressed sufficiently. This is because kickdown should not be inhibited in such a situation.

<Process of Cancelling Kickdown Inhibition Flag FKDP; See FIG. 4> At Step S9, it determines whether or not engine rotational speed NE is higher than or equal to a predetermined rotational speed NE1. In case of YES, it proceeds to Step S5. In case of NO, it proceeds to Step S10. At Step S10, it sets FKDP to off-state. Namely, when it is determined at Step S4 that accelerator pedal opening APO is smaller than predetermined opening APO2, and the engine rotational speed is low, the inhibition of kickdown is cancelled, because engine torque TE has decreased sufficiently, and torque change quantity ΔT caused by following depression or increase of depression of the accelerator pedal is estimated to be large.

<Process in Situation Where Kickdown not Inhibited> At Step S11, it determines whether or not FKDP is on. In case of on-state, it proceeds to Step S17. In case of off-state, it proceeds to Step S12. At Step S12, it sets a lockup off flag FL/UOFF (henceforth referred to as FL/UOFF) to off-state. FL/UOFF is detailed below. At Step S13, it controls lockup clutch L/U by the normal lockup control. It controls lockup clutch L/U into a completely engaged state, or a slip lockup state, or a disengaged state, depending on the driving state. At Step S14, it determines whether or not FKD is on. In case of on-state, a kickdown request is present, so that it proceeds to Step S15 where it performs a kickdown. In case of NO, no kickdown request is present, so that it proceeds to Step S16 where it maintains the current shift position (the second shift position in the first embodiment).

<Lockup Disengagement Request Control Process> At Step S17, it determines whether or not a road gradient θroad is larger than or equal to a predetermined gradient θ1. In case of YES, it determines that it is on a climbing road, and a load is high, and then proceeds to Step S18. In case of NO, it proceeds to Step S20 where it maintains the state of FL/UOFF. The road gradient θroad is not limited specifically but may be estimated based on APO, VSP, and the longitudinal acceleration sensed by acceleration sensor 33, or may be sensed using navigation information or another sensor. The lockup off flag FL/UOFF is a flag that requests complete disengagement of lockup clutch L/U irrespective of controlled state of lockup clutch L/U controlled by the normal lockup control. With FL/UOFF=ON, lockup clutch L/U is disengaged. At Step S18, it determines whether or not accelerator pedal opening APO is larger than or equal to a predetermined opening APO3 indicating a driving force request of a driver. In case of YES, it determines that it is in a situation where there is a road gradient, and a driving force is requested, and then proceeds to Step S19 where it sets FL/UOFF to on-state. In case of NO, it proceeds to Step S20, it maintains the state of FL/UOFF. Namely, when FKDP is on, it is in a situation where kickdown is inhibited even with a kickdown request. In this situation, even when acceleration is requested on a climbing road, a driving force cannot be achieved by downshifting. Accordingly, when it is determined that the acceleration request is present on the climbing road, it requests disengagement of lockup clutch L/U, and ensures a driving force by a torque-amplifying function of torque converter T/C.

Figure 10:
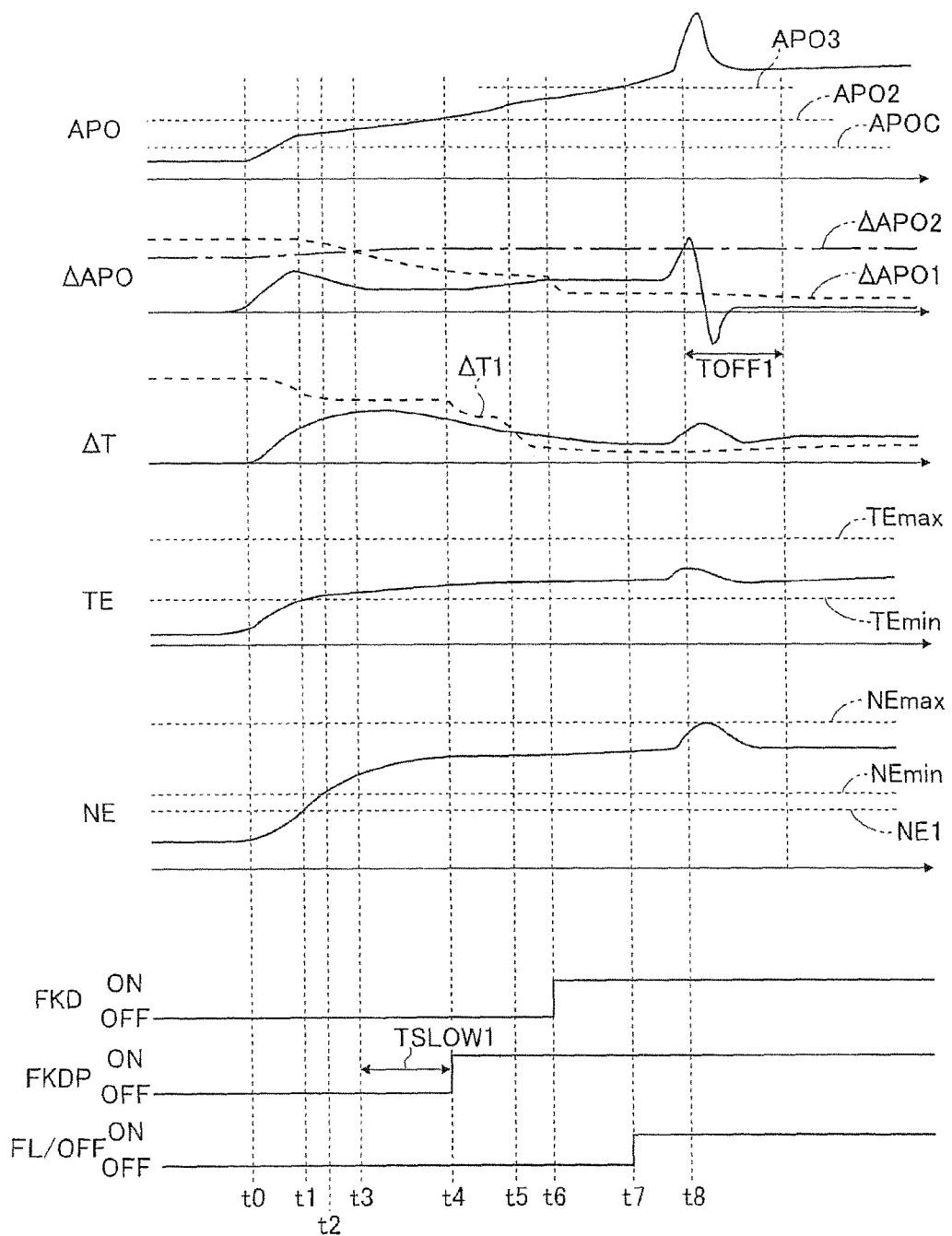
FIG. 10 is a time chart showing the kickdown inhibition control process according to the first embodiment.

<Behavior of Kickdown Inhibition Control Process> The following describes a behavior of the kickdown inhibition control process. FIG. 10 is a time chart showing the kickdown inhibition control process according to the first embodiment. In an initial situation of this time chart, it is assumed that the vehicle is running on a climbing road having a road gradient θroad or more in the second shift position. At a time instant t0, accelerator pedal 19 is depressed by a driver, so that both of engine rotational speed NE and engine torque TE increase. At a time instant t1, engine torque TE becomes larger than or equal to TEmin. At a time instant t2, engine rotational speed NE becomes higher than or equal to NEmin, so that the region determination flag FEA turns on. At a time instant t3, accelerator pedal opening change rate ΔAPO becomes smaller than or equal to predetermined opening change rate threshold value ΔAPO2 indicative of slow depression, so that the slow depression timer TSLOW is counted up. When TSLOW1 has elapsed thereafter, slow depression determination flag FSA turns on, and kickdown inhibition flag FKDP turns on. The kickdown request is thus inhibited. Accordingly, at a time instant t5, kickdown torque change flag FKDT turns on. At a time instant t6, kickdown opening flag FKDA turns on, and kickdown flag FKD turns on, but kickdown inhibition flag FKDP is in on-state, so that no kickdown is performed. This serves to suppress judder.

At a time instant t7 when kickdown is inhibited, accelerator pedal opening APO becomes larger than or equal to APO3, so that lockup off flag FL/UOFF turns on, and the cancelling request for lockup clutch L/U is outputted for ensuring a driving force on the climbing road. In this situation, cancellation of the lockup is forced, even when any control is being performed during the normal lockup control. This serves to ensure a driving force, even when downshifting by kickdown is inhibited.

At a time instant t8, accelerator pedal 19 is rapidly depressed with kickdown inhibited, so that accelerator pedal opening change rate ΔAPO becomes larger than or equal to predetermined opening change rate threshold value ΔAPO2 indicative of slow depression. However, when the timer value of cancelling timer TOFF is smaller than predetermined time period TOFF1, kickdown inhibition flag FKDP is not cancelled. This serves to avoid an unnecessary kickdown when rise of engine torque TE cannot be expected.

As described above, the first embodiment produces the following listed operation effects. <1> An automatic transmission control device for an automatic transmission, includes: transmission controller 24 (shift control means) configured to implement a downshift by disengagement of high clutch H/C (first frictional engagement element), wherein the first frictional engagement element is engaged in a second shift position (gear position before the downshift); region determination flag FEA (engine state determination means) configured to determine whether or not an engine state is in a predetermined region in which torque change quantity ΔT per accelerator pedal opening change rate ΔAPO is smaller than that in another region, and the engine torque is within a predetermined range, and an engine rotational speed is within a predetermined range; slow depression determination flag FSA (operating state determination means) configured to determine whether or not an operating state is in a state of slow depression (predetermined state of accelerator operation) in which the accelerator pedal opening APO is larger than or equal to APOC (predetermined value), and accelerator pedal opening change rate ΔAPO has an absolute value smaller than or equal to ΔAPO2 (predetermined value); and kickdown inhibition flag FKDP (downshift inhibition means) configured to inhibit the kickdown (downshift) in response to a combination of the on-state of region determination flag FEA (determination by the engine state determination means that the engine state is in the predetermined region) and the on-state of slow depression determination flag FSA (determination by the operating state determination means that the operating state is in the predetermined state of accelerator operation). This serves to avoid a judder resulting from downshifting.

<2> It is configured to maintain the kickdown inhibition flag FKDP in the on-state (continue the inhibition of the downshift), when the count value of cancelling timer TOFF as a time period, in which it is determined that the absolute value of accelerator pedal opening change rate ΔAPO is greater than ΔAPO2 (it is determined by the operating state determination means that the operating state is not in the predetermined state of accelerator operation), after kickdown inhibition flag FKDP is turned on, is smaller than TOFF1 (predetermined time period). This serves to suppress judder without immediately permitting a kickdown even when accelerator pedal 19 is depressed suddenly by a driver while kickdown is inhibited.

<3> The automatic transmission includes torque converter T/C including lockup clutch L/U; and the lockup clutch L/U is disengaged in response to a request of a predetermined driving force where road gradient θroad is larger than or equal to predetermined gradient θ1 and accelerator pedal opening APO is larger than or equal to APOP3, while kickdown inhibition flag FKDP is on. This serves to disengage lockup clutch L/U, and ensure a driving force by using the torque-amplifying function of torque converter T/C even when kickdown is inhibited and a driving force cannot be ensured by downshifting.

<Other Embodiment(s)> Although the invention is applied to the vehicle provided with the engine as a drive source in the first embodiment, the invention may be applied to an electric hybrid vehicle including a driving motor or the like. Although the invention is applied to the vehicle including the variator CVT and auxiliary transmission 31 in the first embodiment, the invention may be applied to an ordinary stepwise speed automatic transmission. Although the request for kickdown as an example of downshifting is inhibited in the first embodiment, any other request for downshifting based on shift control may be inhibited when a judder may occur. Specifically, since downshifting is controlled based on vehicle speed VSP, primary rotational speed Npri, and a shift line set based on accelerator pedal opening APO, downshifting may be inhibited based on the shift line.

The invention claimed is:

1. An automatic transmission control device for an automatic transmission, comprising:
    a shift control section configured to implement a downshift by disengagement of a first frictional engagement element, wherein the first frictional engagement element is engaged in a gear position before the downshift;
    an engine state determination section configured to determine whether or not an engine state is in a predetermined region in which a change of an engine torque per a change of an accelerator pedal opening is smaller than that in another region, and the engine torque is within a predetermined range, and an engine rotational speed is within a predetermined range;
    an operating state determination section configured to determine whether or not an operating state is in a predetermined state of accelerator operation in which the accelerator pedal opening is larger than or equal to a predetermined value, and an accelerator pedal opening change rate has an absolute value smaller than or equal to a predetermined value; and
    a downshift inhibition section configured to inhibit the downshift in response to a combination of a determination by the engine state determination section that the engine state is in the predetermined region and a determination by the operating state determination section that the operating state is in the predetermined state of accelerator operation.

2. The automatic transmission control device as claimed in claim 1, wherein the downshift is controlled on a basis of a vehicle speed, a primary rotational speed, and a shift line, wherein the shift line is set depending on the accelerator pedal opening.

3. The automatic transmission control device as claimed in claim 1, wherein the downshift inhibition section is configured to continue the inhibition of the downshift, when a time period, in which it is determined by the operating state determination section that the operating state is not in the predetermined state of accelerator operation, after the downshift is inhibited by the downshift inhibition section, is shorter than a predetermined time period.

4. The automatic transmission control device as claimed in claim 1, wherein:
   the automatic transmission includes a torque converter including a lockup clutch; and
   the lockup clutch is disengaged in response to a request of a predetermined driving force while the downshift is being inhibited by the downshift inhibition section.

* * * * *